(12) United States Patent
Ikeda et al.

(10) Patent No.: US 10,978,754 B2
(45) Date of Patent: Apr. 13, 2021

(54) BATTERY-PACK STORAGE STRUCTURE

(71) Applicant: SUBARU CORPORATION, Tokyo (JP)

(72) Inventors: Shunsuke Ikeda, Tokyo (JP); Yutaka Yokoyama, Tokyo (JP); Kota Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 44 days.

(21) Appl. No.: 16/411,259

(22) Filed: May 14, 2019

(65) Prior Publication Data

US 2019/0393566 A1 Dec. 26, 2019

(30) Foreign Application Priority Data

Jun. 22, 2018 (JP) .............................. JP2018-119148

(51) Int. Cl.
| | |
|---|---|
| *H01M 10/613* | (2014.01) |
| *H01M 10/625* | (2014.01) |
| *H01M 10/6563* | (2014.01) |
| *B60K 1/04* | (2019.01) |
| *B60L 58/26* | (2019.01) |
| *B60K 6/28* | (2007.10) |

(Continued)

(52) U.S. Cl.
CPC ............. *H01M 10/613* (2015.04); *B60K 1/04* (2013.01); *H01M 10/625* (2015.04); *H01M 10/6563* (2015.04); *B60K 6/28* (2013.01); *B60K 2001/005* (2013.01); *B60L 50/64* (2019.02); *B60L 58/26* (2019.02); *B60Y 2200/91* (2013.01); *B60Y 2200/92* (2013.01); *B60Y 2400/112* (2013.01); *H01M 2220/20* (2013.01)

(58) Field of Classification Search
CPC ............. H01M 10/613; H01M 10/625; H01M 10/6563; B60K 1/04
See application file for complete search history.

(56) References Cited

U.S. PATENT DOCUMENTS

| | | | |
|---|---|---|---|
| 2010/0101881 A1 | 4/2010 | Yoda et al. | |
| 2014/0212721 A1* | 7/2014 | Hiranishi | ........ H01M 10/6557 429/99 |

(Continued)

FOREIGN PATENT DOCUMENTS

| | | |
|---|---|---|
| JP | 2005-353480 A | 2/2005 |
| JP | 2009-029159 A | 2/2009 |
| JP | 2009-119936 | 6/2009 |

(Continued)

OTHER PUBLICATIONS

Office Action for Japanese Patent Application No. 2018-119148 dated Feb. 25, 2020 (4 pages with machine translation).

*Primary Examiner* — James Lee
(74) *Attorney, Agent, or Firm* — Smith, Gambrell & Russell, LLP

(57) ABSTRACT

A battery-pack storage structure includes: a battery-case upper part configured to store a battery stack; a battery-case lower part; and a cooling air path through which cooling air for cooling the battery stack flows. The battery-case upper part is disposed on the battery-case lower part, and a bottom-part cooling air path, through which the cooling air flows, is formed between a bottom surface of the battery-case upper part and a bottom surface of the battery-case lower part.

20 Claims, 7 Drawing Sheets

(51) Int. Cl.
*B60K 1/00* (2006.01)
*B60L 50/64* (2019.01)

(56) References Cited

U.S. PATENT DOCUMENTS

2015/0030890 A1 1/2015 Inoue
2017/0087972 A1 5/2017 Hara et al.

FOREIGN PATENT DOCUMENTS

| | | |
|---|---|---|
| JP | 2010-036723 A | 2/2010 |
| JP | 2013-086581 A | 5/2013 |
| JP | 2014-149959 A | 8/2014 |
| JP | 2015-26569 | 2/2015 |
| JP | 2017-069034 A | 4/2017 |

* cited by examiner

BATTERY-PACK STORAGE STRUCTURE

CROSS-REFERENCE TO RELATED APPLICATIONS

The present application claims priority from Japanese Patent Application No. 2018-119148 filed on Jun. 22, 2018, the entire contents of which are hereby incorporated by reference.

BACKGROUND

The disclosure relates to a battery-pack storage structure, and more specifically, to a battery-pack storage structure that can protect battery stacks from a heat source in the case of an accident.

Electric vehicles and hybrid vehicles have a large-capacity vehicle battery that supplies power to a motor, which provides the vehicle with the driving force, to rotate the motor.

Such a vehicle battery is heavy and occupies a large volume to ensure a sufficient continuous driving distance. Hence, the vehicle battery is disposed, for example, below seats, below the rear floor, or the like.

Various configurations for storing large batteries in vehicles have been proposed. Japanese Unexamined Patent Application Publication (JP-A) No. 2009-119936 discloses a vehicle-battery cooling device in which a battery pack case has a double-structured bottom. More specifically, a double-structured duct space is formed below a battery that is formed of a plurality of cells. With this configuration, the battery is effectively cooled. JP-A No. 2015-26569 also discloses a similar double-structured bottom part.

SUMMARY

An aspect of the disclosure provides a battery-pack storage structure including a battery-case upper part configured to store a battery stack, a battery-case lower part, and a cooling air path through which cooling air for cooling the battery stack flows. The battery-case upper part is disposed on the battery-case lower part, and a bottom-part cooling air path, through which the cooling air flows, is formed between a bottom surface of the battery-case upper part and a bottom surface of the battery-case lower part.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
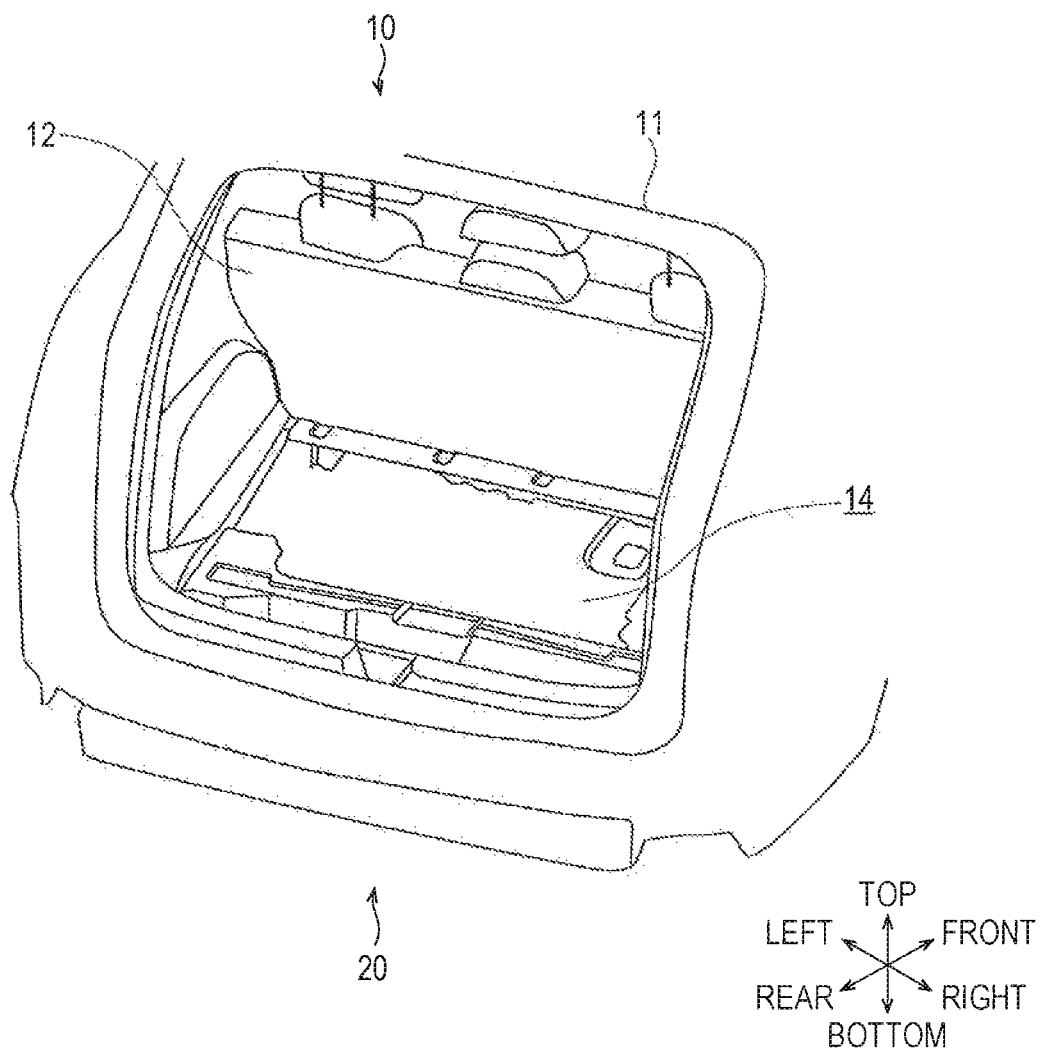
FIG. 1 is a perspective view of a vehicle having a battery-pack storage structure according to an embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. JP-A No. 2009-119936 discloses a configuration in which the battery case has two bottoms, between which an air path is formed. However, because this air path is used solely for cooling, the overall configuration of the cooling mechanism may become complex.

Furthermore, in the case of a collision or the like, the battery may be unexpectedly heated from below. In that case, if no countermeasures are taken, the battery may be overheated and damaged.

The disclosure has been made in view of these circumstances, and it is desirable to provide a battery-pack storage structure that prevents a battery from being overheated by an external heat source in the case of an accident.

A storage structure for a battery pack 20 (battery-pack storage structure) according to an embodiment of the disclosure, and a vehicle having the battery pack 20 will be described.

FIG. 1 is a perspective view, as viewed from the upper rear side, of a vehicle 10 having the battery pack 20. In FIG. 1, a rear gate that covers the rear end of a vehicle body 11 of the vehicle 10 is not illustrated. The vehicle 10 is, for example, a hybrid vehicle that has a motor and an engine as driving sources, or an electric vehicle that has a motor alone as a driving source.

A rear seat 12 is provided on the rear side in the vehicle cabin of the vehicle body 11, and a storage space 14 is formed behind the rear seat 12. The battery pack 20 is disposed inside the storage space 14. Herein, the battery pack 20 is covered with a cover (not illustrated).

Figure 2:
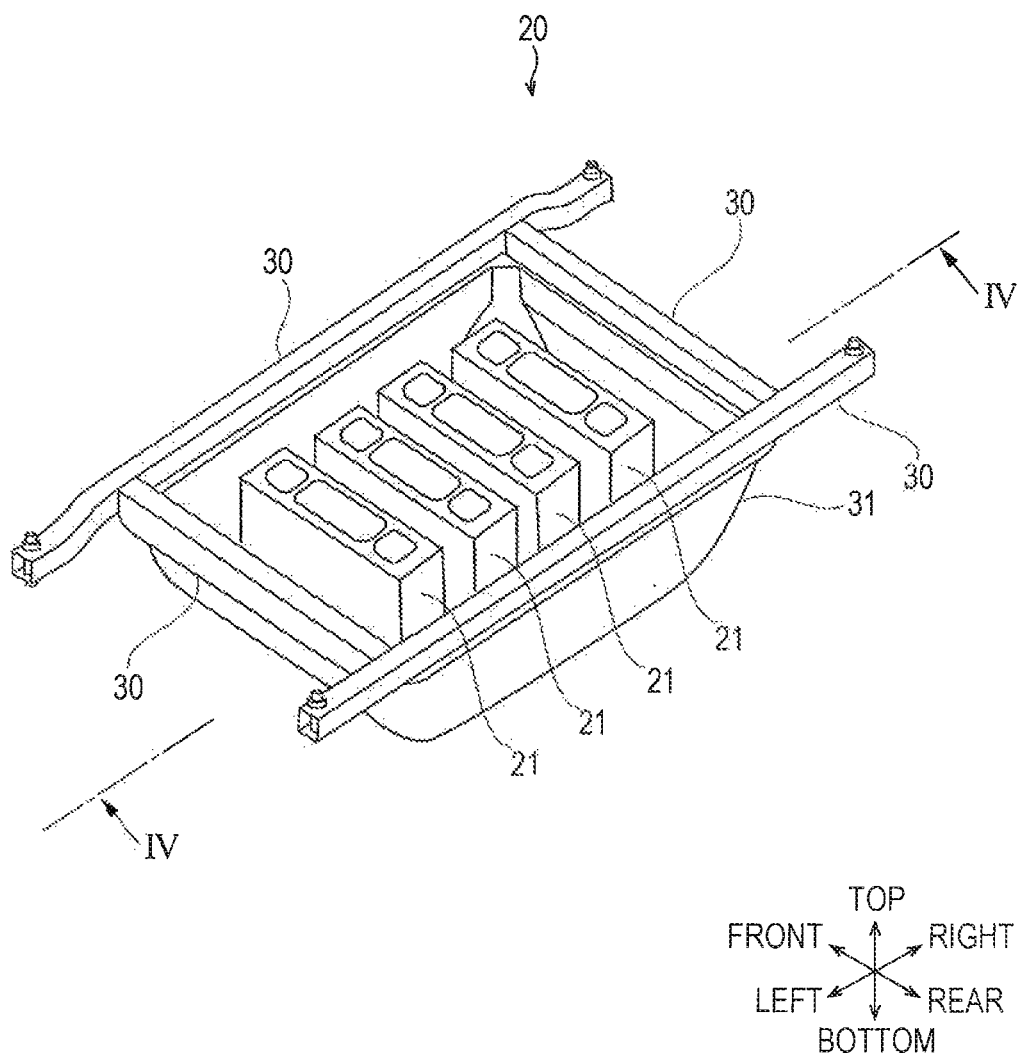
FIG. 2 is a perspective view of a battery pack according to the embodiment of the disclosure.

Referring to FIG. 2, the battery pack 20 will be described. The battery pack 20 protects a plurality of battery stacks 21. The battery pack 20 includes a battery-case upper part 31 in which the battery stacks 21 are stored, and a frame 30 that supports the four upper ends of the battery-case upper part 31. The battery stacks 21 are each formed of plate-shaped battery cells that are layered in the front-rear direction.

Figure 3:
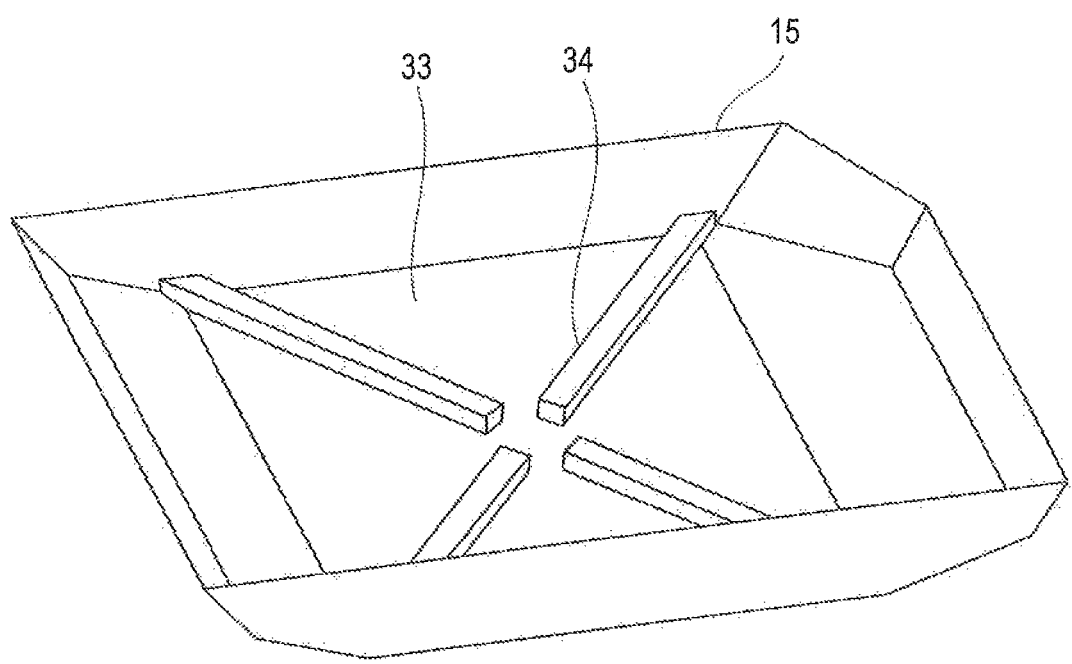
FIG. 3 is a perspective view of a battery-case lower part according to the embodiment of the disclosure.

FIG. 3 illustrates a battery-case lower part 15 in which the battery pack 20 is stored. The battery-case lower part 15 has a container shape and can store the battery-case upper part 31. Beads 34 projecting in the shape of walls are formed on a bottom surface 33 of the battery-case lower part 15. The beads 34 are formed so as to extend in a straight line from around the center toward the corners. Herein, four beads 34 are formed. When the battery-case upper part 31, illustrated in FIG. 2, is stored in the battery-case lower part 15, the bottom surface 35 (FIG. 4) of the battery-case upper part 31 comes into contact with the beads 34. The beads 34 disposed between the bottom surface 35 of the battery-case upper part 31 and the bottom surface 33 of the battery-case lower part 15 can regulate the flow of cooling air flowing therebetween.

Figure 4:
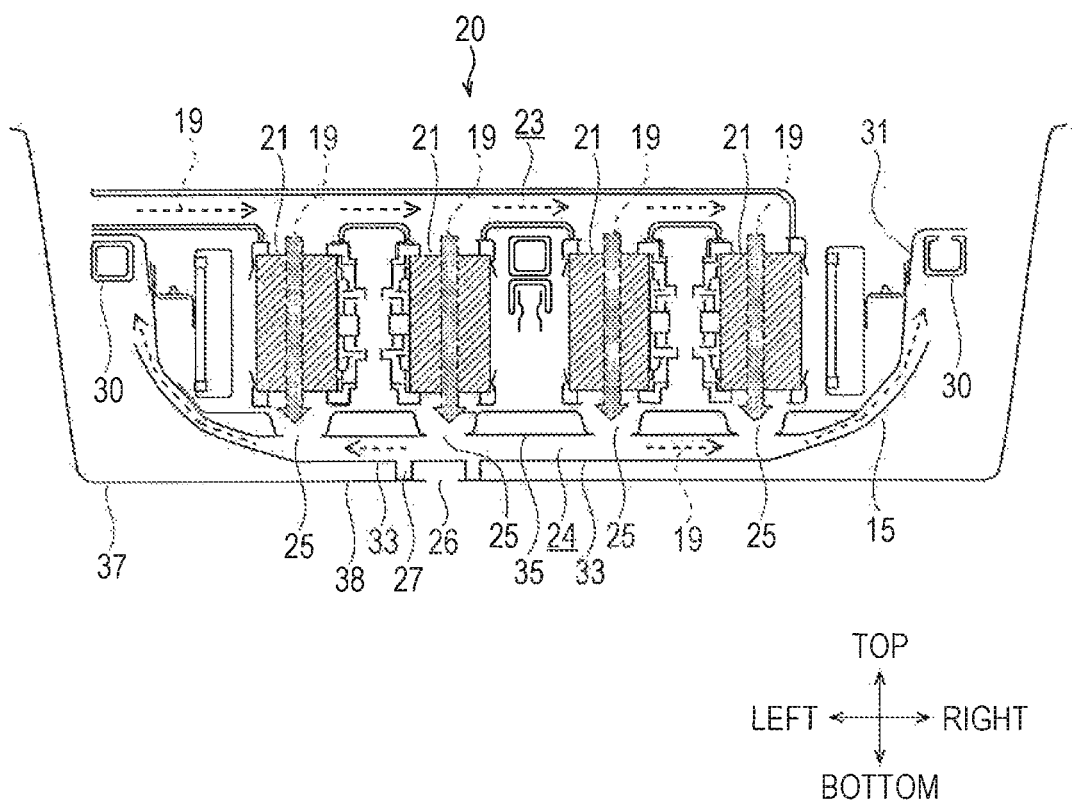
FIG. 4 is a sectional view of the battery-pack storage structure according to the embodiment of the disclosure.

FIG. 4 is a sectional view taken along line IV-IV in FIG. 2. As illustrated in FIG. 4, the battery pack 20 has a cooling air path 23 for cooling the battery stacks 21 when the battery stacks 21 are charged or discharged. The cooling air path 23 is formed above the battery stacks 21 and through which the cooling air 19, which is conditioned air conditioned in the vehicle cabin, is sent toward the battery stacks 21. The cooling air path 23 forms air jet ports above the battery stacks 21, from which the cooling air 19 is blown downward.

A bottom-part cooling air path 24 is formed below the battery stacks 21. The bottom-part cooling air path 24 serves as a gap between the bottom surface 35 of the battery-case upper part 31 and the bottom surface 33 of the battery-case lower part 15. The bottom-part cooling air path 24 extends to the periphery of the battery-case upper part 31. Furthermore, the battery-case lower part 15 is stored in a container-shaped vehicle body floor 37.

Furthermore, multiple case holes 25 are provided in the bottom surface 35 of the battery-case upper part 31. The case holes 25 are provided below the battery stacks 21.

Furthermore, a floor hole 26 is provided in the bottom surface 38 of the vehicle body floor 37, at an area below the case hole 25. The floor hole 26 enables, for example, welding. Although one floor hole 26 is illustrated, there may be more than one floor hole 26 in the bottom surface 38 of the vehicle body floor 37.

In the thus-configured battery pack 20, the battery stacks 21 that are charged or discharged are cooled as below. First, the conditioned cooling air 19 in the vehicle cabin is introduced into the cooling air path 23. Herein, the cooling air 19 may be sent to the cooling air path 23 by an air blowing fan (not illustrated).

The cooling air 19 sent to the cooling air path 23 is blown at the battery stacks 21 from above. More specifically, the cooling air 19 is blown downward from above such that the air flows between the battery cells constituting the battery stacks 21. As a result of the cooling air 19 and the battery stacks 21 exchanging heat, the battery stacks 21 are cooled. In other words, the cooling air 19 flows inside the battery-case upper part 31 so as to wrap the battery stacks 21.

The cooling air 19 that has exchanged heat with the battery stacks 21 is sent to the sides of the battery pack 20 through the bottom-part cooling air path 24. Thereafter, the cooling air 19 may be discharged outside the car or may be returned into the vehicle cabin.

By using the conditioned air inside the vehicle cabin as the cooling air 19 for cooling the battery stacks 21, a vehicle-cabin temperature-adjusting device for adjusting the temperature of the vehicle cabin can be utilized also as a battery cooling device.

With this configuration, in this embodiment, overheating of the battery stacks 21 in the case of an accident or the like is prevented. More specifically, when an unexpected heat source is generated below the vehicle body floor 37 in the case of a collision or the like, the heat source may heat the battery stacks 21, which is undesirable. In the embodiment, the bottom-part cooling air path 24 is formed between the battery-case upper part 31, in which the battery stacks 21 are stored, and the battery-case lower part 15, in which the battery-case upper part 31 is stored. Hence, the bottom-part cooling air path 24 functions as an insulating layer, preventing the external heat from propagating to the battery stacks 21. Thus, overheating of the battery stacks 21 in an emergency is suppressed.

Furthermore, in an emergency, by sending the cooling air 19 to the bottom-part cooling air path 24, the cooling air 19 releases the heat from the outside. Hence, it is possible to further suppress overheating of the battery stacks 21.

Furthermore, because the floor hole 26 is provided in the bottom surface 38 of the vehicle body floor 37, if no countermeasures are taken, the hot air may enter through the floor hole 26, overheating the battery stacks 21. In this embodiment, the case holes 25 are provided above the floor hole 26. That is, when viewed from above, the floor hole 26 and the case holes 25 at least partially overlap each other. With this configuration, even if the hot air enters inside through the floor hole 26, the cooling air 19 blown downward through the case holes 25 prevent the heat from propagating via the floor hole 26. Hence, it is possible to prevent the battery stacks 21 from being unexpectedly overheated by the hot air.

FIG. 4 illustrates four case holes 25. The amount of the cooling air 19 blown to the bottom-part cooling air path 24 from the case holes 25 provided near the center may be larger than the amount of the cooling air 19 blown to the bottom-part cooling air path 24 from the case holes 25 provided at the ends. With this configuration, the cooling air 19 in the bottom-part cooling air path 24 more easily flows from the center of the battery pack 20 to the ends of the battery pack 20.

Figure 5:
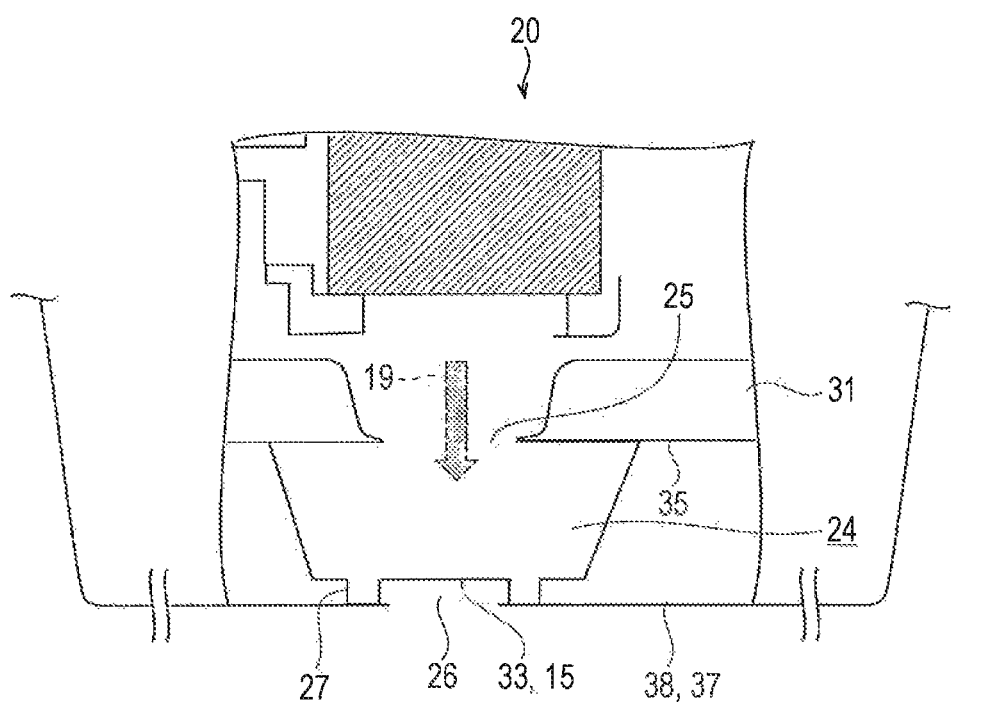
FIG. 5 is an enlarged sectional view of the battery-pack storage structure according to the embodiment of the disclosure.
Figure 5:
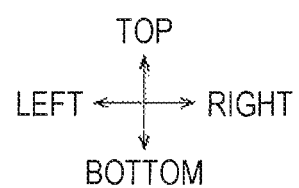

As illustrated in FIG. 5, the bottom surface 33 partially swells downward at a position below a case hole 25. Furthermore, a wall 27 is formed on the lower surface of the bottom surface 33 of the portion swelling downward.

The lower end portion, that projects in a ring shape, of the wall 27 is in contact with the bottom surface 38 of the portion around the floor hole 26, from above.

By enclosing the floor hole 26 with the wall 27 as described above, even if there is a heat source below the bottom-part cooling air path 24 in an emergency, the entrance of heat from the heat source is prevented by the wall 27. Hence, the entrance of the hot air into the vehicle through the floor hole 26 is prevented.

The wall 27 may be formed so as to extend continuously from one end to the other end in the vehicle-body width direction. With this configuration, the wall 27 can be used also as a reinforcing member, and thus, it is possible to absorb the striking energy with the wall 27 at the time of a collision.

Figure 6:
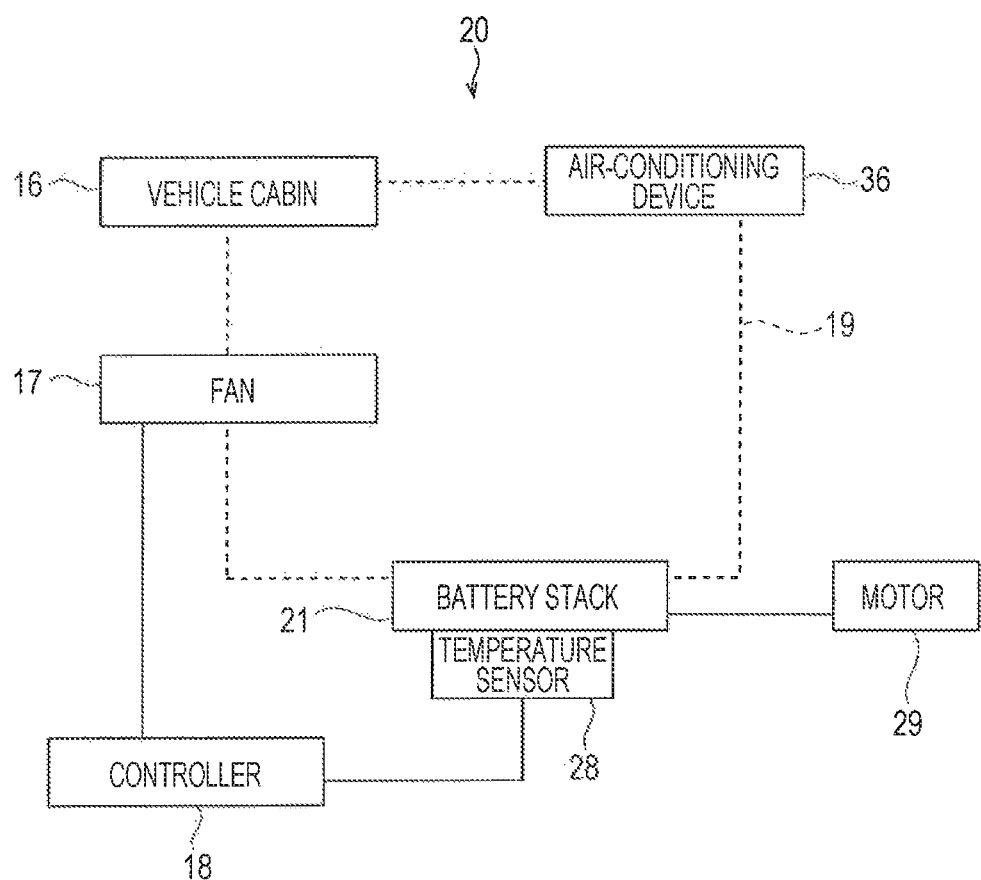
FIG. 6 illustrates the connection between components of the battery-pack storage structure according to the embodiment of the disclosure.

Referring to FIG. 6, the connection between components of the battery pack 20 will be described. The battery pack 20 mainly includes a fan 17, the battery stacks 21, a temperature sensor 28, and a controller 18. The battery pack 20 charges or discharges the battery stacks 21 within an appropriate temperature range.

The fan 17 is disposed in the air path through which the cooling air 19 flows to circulate the cooling air 19 between a vehicle cabin 16 and an air-conditioning device 36. The cooling air 19 is also supplied to the battery stacks 21 to cool the cells constituting the battery stacks 21.

The temperature sensor 28 measures the temperature of the battery stacks 21 and transmits an electric signal showing the temperature of the battery stacks 21 to the controller 18.

The controller 18 includes a CPU, a RAM, and a ROM and controls the amount of air blown by the fan 17 on the basis of, for example, the temperature of the battery stacks 21 measured by the temperature sensor 28.

A motor 29, which is rotated by the power supplied by the battery stacks 21, is a driving-force generator that supplies a driving force to the vehicle 10 illustrated in FIG. 1. A charging engine for charging the battery stacks 21 may be provided.

The thus-configured battery pack 20 operates as follows. That is, when the battery stacks 21 are charged, power is supplied to the battery stacks 21 from an external power supply, an on-vehicle power generator, or the like. To prevent overheating of the battery stacks 21 during charging, the controller 18 actuates the fan 17 according to the output of the temperature sensor 28 to send the cooling air 19 to the battery stacks 21. As a result, the battery stacks 21 and the cooling air 19 exchange heat, thus suppressing overheating of the battery stacks 21.

When the battery stacks 21 discharge, the vehicle 10 is driven as a result of the motor 29 being rotated by the power supplied from the battery stacks 21. Furthermore, when the battery stacks 21 discharge, the fan 17 appropriately sends the air to the cooling air 19 according to the output of the temperature sensor 28. In other words, the controller 18 controls the amount of air blown by the fan 17 so that the temperature of the battery stacks 21 is less than or equal to a certain level.

Furthermore, when the temperature of the battery stacks 21, measured by the temperature sensor 28, exceeds a normal temperature range in an emergency, the controller 18 determines that an external heat source is near the battery stacks 21. In such a case, the controller 18 sets the amount of air blown by the fan 17 to a level greater than that during charging and discharging, which is, for example, the maximum level. By doing so, as has been described with reference to FIG. 5, it is possible to prevent the heat from entering the vehicle through the floor hole 26. Furthermore, as illustrated in FIG. 4, by increasing the flow rate of the cooling air 19 flowing through the bottom-part cooling air path 24, the insulating effect achieved by the bottom-part cooling air path 24 can be further improved to protect the battery stacks 21 from the heat source.

Although the embodiments of the disclosure have been described above, the disclosure is not limited thereto. The disclosure can be modified within the scope not departing from the spirit thereof.

Figure 7A:
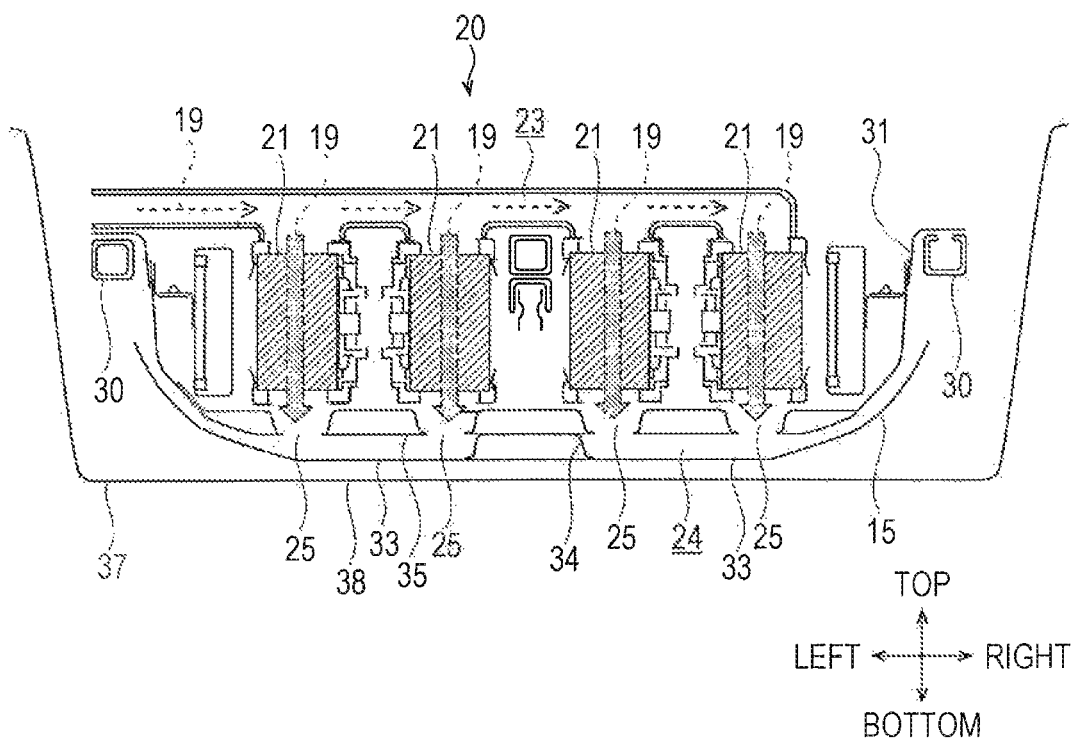
FIGS. 7A and 7B are sectional views of a battery-pack storage structure according to another embodiment of the disclosure.
Figure 7B:
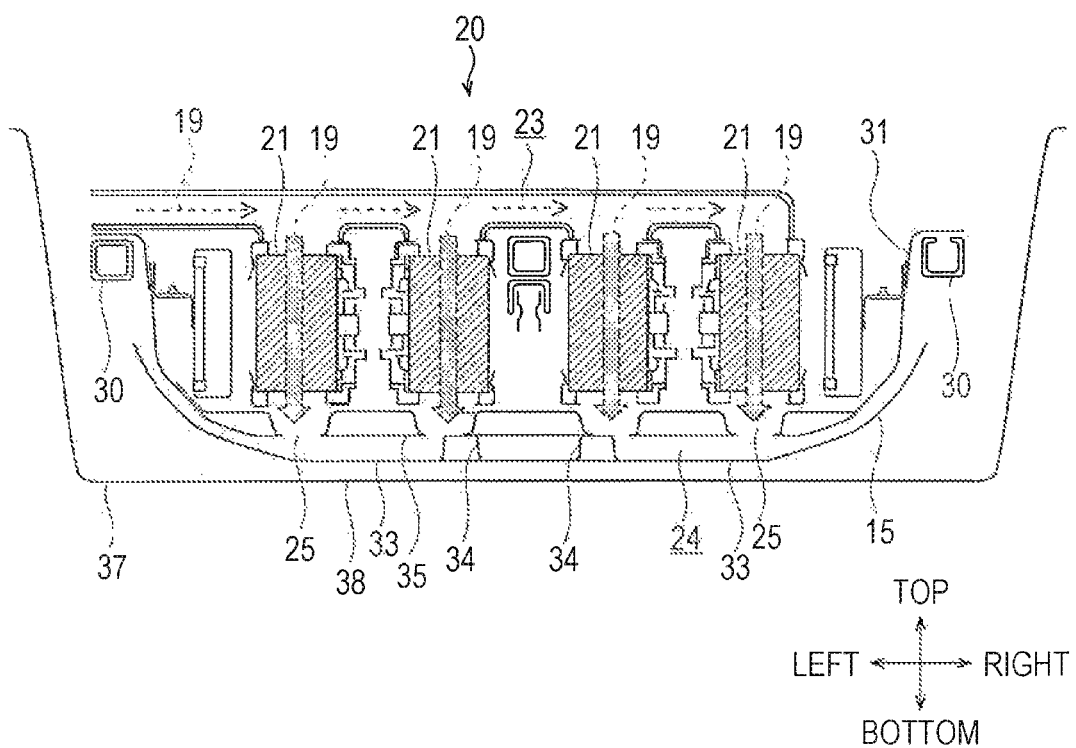

For example, as illustrated in FIG. 7A, the bead 34 may be formed at the center in the left-right direction. In this case, the bead 34 extends in the front-rear direction. With this configuration, it is possible to increase the strength of the central portion of the battery pack 20 in the left-right direction and to protect the battery stacks 21 at the time of a collision. Furthermore, as illustrated in FIG. 7B, the beads 34 may be formed at positions slightly shifted from the center in the left-right direction. There may be multiple beads 34. Also with these configurations, it is possible to protect the battery stacks 21 at the time of a collision.

The disclosure provides a battery-pack storage structure including: a battery-case upper part configured to store a battery stack; a battery-case lower part; and a cooling air path through which cooling air for cooling the battery stack flows. The battery-case upper part is disposed on the battery-case lower part, and a bottom-part cooling air path, through which the cooling air flows, is formed between a bottom surface of the battery-case upper part and a bottom surface of the battery-case lower part. By forming the bottom-part cooling air path, through which the cooling air flows, between the bottom surface of the battery-case upper part and the bottom surface of the battery-case lower part, even if the battery-case lower part is heated from below, it is possible use the bottom-part cooling air path as an insulator and to prevent overheating of the battery pack. Furthermore, because the gap between the battery-case upper part and the battery-case lower part is used as the bottom-part cooling air path in the disclosure, there is no need to form a dedicated air path below the battery pack. Hence, it is possible to improve the cooling efficiency of the battery with a simple configuration.

Furthermore, in the battery-pack storage structure according to the disclosure, case holes may be provided in the bottom surface of the battery-case upper part, a floor hole may be provided in a bottom surface of the vehicle body floor in which the battery-case lower part is stored, and the case holes and the floor hole may be provided at positions at least partially overlapping each other. Hence, by blowing the cooling air through the cooling air path and the case holes in the case of an accident or the like, heat conduction from the floor hole to the battery pack is suppressed.

The battery-pack storage structure according to t the disclosure may further include a wall surrounding the floor hole. Hence, it is possible to prevent, with the wall, hot air from entering the space between the battery-case lower part and the vehicle body floor through the floor hole, and thus to ensure the effect of preventing overheating of the battery pack. In other words, the battery is heated only at an area around the floor hole, and the heat does not propagate to the other areas.

In the battery-pack storage structure according to the disclosure, the wall may be formed on the battery-case lower part. Because the wall constitutes a portion of the battery-case lower part, the component count does not increase.

The battery-pack storage structure according to the disclosure may further include a fan configured to send the cooling air to the cooling air path; a temperature sensor configured to measure the temperature of the battery stack; and a controller configured to control the fan on the basis of the output of the temperature sensor. The controller increases the amount of air blown by the fan if the temperature of the battery stack measured by the temperature sensor reaches or exceeds a certain level. Hence, by sending a large amount of cool air to the space between the bottom surface of the battery-case upper part and the bottom surface of the battery-case lower part under a circumstance in which the battery stack can be overheated, it is possible to prevent overheating of the battery stack.

The battery-pack storage structure according to the disclosure may further include a bead that is formed by raising, in a wall shape, a part of the bottom surface of the battery-case lower part. Hence, it is possible to regulate, with the bead, the cooling air flowing through the bottom-part cooling air path.

In the battery-pack storage structure according to the disclosure, the amount of the cooling air blown to the bottom-part cooling air path from the case holes provided near the center may be larger than the amount of the cooling air blown to the bottom-part cooling air path from the case holes provided near the ends. Hence, the cooling air in the bottom-part cooling air path can easily flow from the center of the battery pack to the ends of the battery pack.

In the battery-pack storage structure according to the disclosure, the wall may be formed so as to be continuous from one end to the other end in the vehicle-body width direction. Hence, the wall can be used as a reinforcing member, and thus, it is possible to absorb the striking energy with the wall to protect the battery stack at the time of a collision.

The invention claimed is:

1. A battery-pack storage structure comprising:
   a first battery-case configured to store a battery stack, the first battery-case including a first cooling air path through which cooling air for cooling the battery stack flows, the first cooling air path being configured to be formed above the battery stack positioned inside the first battery-case; and
   a second battery-case configured to cover at least a lower part of the first battery-case such that the first battery-case is at least partially received within the second battery-case,
   a second cooling path through which cooling air, which is drawn from at least one case hole provided at a bottom surface of the first battery-case, flows; and
   wherein the second cooling path, through which the cooling air flows, is formed between a bottom surface of the first battery-case and a bottom surface of the second battery-case.

2. The battery-pack storage structure according to claim 1, wherein
   the at least one case hole includes a plurality of case holes that are provided in the bottom surface of the first battery-case, and the case holes are provided at positions such that at least one case hole at least partially overlaps with at least one floor hole provided in a bottom surface of a vehicle body floor in which the second battery-case is stored.

3. The battery-pack storage structure according to claim 2, further comprising a wall surrounding the at least one floor hole.

4. The battery-pack storage structure according to claim 3, wherein the wall is formed on the second battery-case.

5. The battery-pack storage structure according to claim 1, further comprising:
   a fan configured to send cooling air to the first cooling air path;
   a temperature sensor configured to measure a temperature of the battery stack; and
   a controller configured to control the fan on a basis of an output of the temperature sensor,
   wherein the controller increases an amount of air blown by the fan if the temperature of the battery stack measured by the temperature sensor reaches or exceeds a certain level.

6. The battery-pack storage structure according to claim 2, further comprising:
   a fan configured to send cooling air to the first cooling air path;
   a temperature sensor configured to measure a temperature of the battery stack; and
   a controller configured to control the fan on a basis of an output of the temperature sensor,
   wherein the controller increases an amount of air blown by the fan if the temperature of the battery stack measured by the temperature sensor reaches or exceeds a certain level.

7. The battery-pack storage structure according to claim 3, further comprising:
   a fan configured to send cooling air to the first cooling air path;
   a temperature sensor configured to measure a temperature of the battery stack; and
   a controller configured to control the fan on a basis of an output of the temperature sensor,
   wherein the controller increases an amount of air blown by the fan if the temperature of the battery stack measured by the temperature sensor reaches or exceeds a certain level.

8. The battery-pack storage structure according to claim 4, further comprising:
   a fan configured to send cooling air to the first cooling air path;
   a temperature sensor configured to measure a temperature of the battery stack; and
   a controller configured to control the fan on a basis of an output of the temperature sensor,
   wherein the controller increases an amount of air blown by the fan if the temperature of the battery stack measured by the temperature sensor reaches or exceeds a certain level.

9. The battery-pack storage structure according to claim 1, further comprising at least one bead that is formed by raising, in a wall shape, a part of the bottom surface of the second battery-case.

10. The battery-pack storage structure according to claim 2, further comprising at least one bead that is formed by raising, in a wall shape, a part of the bottom surface of the second battery-case.

11. The battery-pack storage structure according to claim 3, further comprising at least one bead that is formed by raising, in a wall shape, a part of the bottom surface of the second battery-case.

12. The battery-pack storage structure according to claim 4, further comprising at least one bead that is formed by raising, in a wall shape, a part of the bottom surface of the second battery-case.

13. The battery-pack storage structure according to claim 2, wherein the case holes are provided both in a center region of the first battery-case and at end regions of the first battery case, and an amount of cooling air blown to the second cooling air path from the case holes provided in the center region is larger than an amount of the cooling air blown to the second cooling air path from the case holes provided in the end regions.

14. The battery-pack storage structure according to claim 3, wherein the wall is formed so as to be continuous from one end to an opposite end of the second battery-case in a vehicle-body width direction.

15. The battery-pack storage structure according to claim 1, wherein the second cooling path has an outlet that is configured as to discharge cooling air that has traveled in the second cooling path to a location directly outside of a vehicle receiving the battery-pack storage structure.

16. A battery-pack storage structure, comprising:
   a first battery-case configured to receive a battery stack above an upper surface of the first battery-case, the first battery-case being in fluid communication with a first cooling air path through which cooling air for cooling the battery stack flows, the first cooling air path configured to have the cooling air travel from above the battery stack and along a side of the battery stack received inside the first battery-case; and
   a second battery-case configured to cover over a lower surface of the first battery-case in a nested arrangement,
   a second cooling path through which the cooling air, which is drawn from at least one case hole provided in the first battery-case, flows; and the second cooling path, through which the cooling air flows, is formed between a lower surface of the first battery-case and an opposing, upper surface of the second battery-case.

17. The battery-pack storage structure according to claim 16, further comprising at least one bead that is formed by raising, in a wall shape, a part of the second battery-case.

18. The battery-pack storage structure according to claim 16, further comprising:
   a fan configured to send cooling air to the first cooling air path;
   a temperature sensor configured to measure a temperature of the battery stack; and
   a controller configured to control the fan on a basis of an output of the temperature sensor,
   wherein the controller increases an amount of air blown by the fan if the temperature of the battery stack measured by the temperature sensor exceeds a preset emergency temperature level that is based on an external heat source.

19. The battery-pack storage structure according to claim 16, wherein the second cooling path has an outlet that is configured as to discharge cooling air that has traveled in the second cooling path to a location outside of a vehicle receiving the battery-pack storage structure.

20. The battery-pack storage structure according to claim 16, wherein the at least one case hole includes a plurality of case holes that vary in hole size, with at least one larger sized case hole being more centralized in the first battery-case than a smaller sized case hole.

* * * * *